Patented Oct. 28, 1941

2,260,367

UNITED STATES PATENT OFFICE 2,260,367

TREATMENT OF SUBSTANTIALLY SOLID RESINOUS LINEAR CONDENSATION POLYMERS

Archie L. Dubeau, Lewiston, and James Douglas MacMahon, Niagara Falls, and George P. Vincent, New York, N. Y., assignors to The Mathieson Alkali Works, Inc., New York, N. Y., a corporation of Virginia No Drawing. Application June 23, 1939, Serial No. 280,816

10 Claims. (Cl. 260—78)

This invention is concerned with the treatment of substantially solid resinous bodies to improve their appearance and increase their amenability to dyeing. In particular the invention contemplates the treatment of solid resinous bodies which are synthetic linear condensation polymers capable of being drawn into pliable, strong fibres showing by characteristic X-ray patterns orientation along the fibre axis, such, for example, as thermoplastic polyamides obtained by heating in substantially equimolecular proportions a diamine and a dibasic acid or an amide forming derivative of such an acid under conditions of condensation and polymerization until a product of high molecular weight with film or fibre forming qualities is obtained. Such bodies are known generally as "Nylon," and they and methods for their manufacture are described in United States Patents Nos. 2,071,250, 2,071,251, 2,130,947 and 2,130,948. The bodies may take the form of fabrics, filaments, bristles, sheets, ribbons, rods, tubes, etc.

The thermoplastic resinous bodies considered herein have a variety of formulae and may be made from a variety of diamines and dibasic acids or derivatives thereof, as well as from other substances as described in the aforementioned patents. By selecting the proper combination of diamine and dibasic acid, resins having different melting points and other characteristics may be formed. Thus from hexamethylenediamine and diphenic acid a solid resinous body having a melting point of 157° C. is obtained, whereas the product of reaction of tetramethylenediamine and adipic acid has a melting point of 278° C. From the commercial standpoint the products obtained from a diamine and adipic or sebacic acid probably are most important at the present time.

Resinous products of the "Nylon" type have many valuable properties and bid fair to assume an important industrial role, particularly in the textile trade, where their high tensile strength in filament form and their resistance to permanent distortion even when wet are important advantages. However, certain disadvantages attach to these products, not the least of which is that they tend to be produced in a discolored or "off-white" state. Despite the conduct of condensation and polymerization in glass or noble metal equipment to avoid contamination in so far as possible and despite the preparation of the polymer and its subsequent treatment substantially in the absence of oxygen (as, for example, under a blanket of inert gas such as nitrogen, carbon dioxide or hydrogen) in order to obtain a light colored product, some discoloration results, and the product frequently has a distinct yellow tinge which renders it objectionable for some purposes. Moreover, polyamide and other resinous bodies of the "Nylon" type are not amenable to dyeing to an adequate extent. Most dyes tend to penetrate them unevenly and not deeply, with the result that the dyed bodies have a "streaked" appearance, especially if they be in fabric form.

As a result of our investigations, we have discovered that discoloration of resinous solids of the "Nylon" type may be removed by treating them with an aqueous and preferably acid solution containing chlorite ions. Such treatment results, moreover, in an improved amenability of the product to dyeing, in that dyes tend to penetrate the treated product more uniformly and give a "brighter" and more uniform finish (and this is so even when the treatment is such that bleaching is not complete). Furthermore, bleaching of the product and the increased amenability to dyeing may be obtained by chlorite treatment without deleteriously affecting the strength of the product to a substantial degree.

Chlorite ions are employed preferably in acid solutions, having a pH ranging from about 3 to about 5, because such solutions readily bleach the bodies, in addition to improving their amenability to dyeing, and do not affect their strength appreciably even at high temperatures. Basic solutions containing chlorite ions are also effective, provided that they are activated by including hypochlorite ions therein.

The concentration of chlorite to employ in the solution is dependent, to some degree at least, upon the desired treatment time and the degree of discoloration in the product to be treated, but generally speaking the concentrations should be maintained at low values, say not to exceed chlorite in excess of the equivalent of 10 gms. of available chlorine per liter, and preferably in the range of from 0.5 to 2.0 gms. per liter. With such concentrations of chlorite in acid solutions a product that is thoroughly bleached and suitable for dyeing is obtained in a period of from 30 minutes to 2 hours at temperatures ranging from about 25° C. to about 80° C.

The solution containing chlorite ions may be prepared in a variety of ways, but is obtained advantageously by dissolving in the solution alkali metal chlorites. As noted hereinbefore, basic solutions of alkali metal chlorites are not effective in the practice of the invention unless they are "activated" due to the presence of hypochlorites. Hence, some hypochlorite should be added to solutions of alkali metal chlorite if the solutions are employed in a basic condition. In acid solutions, however, the alkali metal chlorites are effective in the absence of hypochlorite.

Bleaching of the resinous bodies herein contemplated is accelerated by including in acid chlorite solutions a small proportion of a synthetic detergent that exerts its detergent action in the presence of the acid and does not tend to decompose substantially in the solution. A number of synthetic detergents fulfill these requirements, among them being:

| Example | General formula and classification |
|---|---|
| Sodium lauryl sulfate | R—SO$_4$Na—A primary alcohol sulfate, in which R represents a hydrocarbon group. |
| Sodium-2 methyl pentane 4 sulfate | $\begin{array}{c}R\\ \phantom{R}\diagdown\\ \phantom{RR}CHSO_4Na\\ \phantom{R}\diagup\\ R'\end{array}$ A secondary aliphatic alcohol sulfate, in which R and R' represent hydrocarbon groups. |
| Sodium sulfoethylmethyl-lauramide. | CH$_2$—NCH$_3$—COR<br>\|<br>CH$_2$—SO$_3$Na<br>A fatty acid amide in which R represents a hydrocarbon group. |
| Sodium sulfoethyl myristate. | CH$_2$OOCR<br>\|<br>CH$_2$SO$_3$Na<br>A fatty acid ester, in which R represents a hydrocarbon group. |
| Sodium diamyl sulfosuccinate. | CH$_2$COOR'<br>\|<br>NaSO$_3$CHCOOR<br>A sulfonate succinic acid ester, in which R and R' represent hydrocarbon groups. |
| Sodium decyl benzene sulfonate. | R—⬡—SO$_3$Na<br>An alkylated aromatic sulfonate. |
| Sodium hexadecyl sulfonate. | RSO$_3$Na—An aliphatic sulfonate in which R represents a hydrocarbon group. |

The proportion of detergent employed may be relatively small, and in general nothing is gained through the use of large proportions thereof. Thus 0.5 gm. per liter of a synthetic detergent known as "Gardinol" and consisting essentially of sodium lauryl sulphate, aids markedly in bleaching the resinous product in textile form and in increasing its amenability to dyeing.

Our invention will be more thoroughly understood in the light of the following description of presently preferred practices thereof.

Sodium chlorite solution for use in the practice of the invention may be made by dissolving anhydrous sodium chlorite directly in water. It is convenient to make a stock solution containing sodium chlorite equivalent to about 50 gms. per liter available chlorine. Such a stock solution should be maintained slightly alkaline, since in the alkaline condition the sodium chlorite is more stable.

Sodium hypochlorite stock solution for use in activating basic chlorite solution may be made conveniently by dissolving calcium hypochlorite in water, to obtain a concentration of available chlorine of say 50 gms. per liter, sodium carbonate being added to precipitate the calcium as calcium carbonate. The calcium carbonate precipitate may be removed from the stock solution by filtration or decantation.

The chlorite stock solution is diluted to appropriate concentration with water and then its pH is regulated by addition of acid or alkali prior to use, alkaline chlorite solutions being "activated" by the addition of small proportions of the hypochlorite stock solution. Acetic acid and many others, including the strong mineral acids may be employed to obtain a relatively low pH, and alkali metal hydroxides may be used to impart alkalinity, if this is desired.

SERIES I

A first series of tests were run in which approximately 10 gm. of "Nylon" sewing thread identified as "Neophil K 25" and composed of a product of the condensation and polymerization of a diamine and a dibasic acid, such as adipic acid was treated in each instance in 100 cc. of a solution containing sodium chlorite equivalent to 0.5 gm. per liter chlorine. In the individual tests the pH of the solution was maintained respectively at 3, 4 and 5 and the temperature in some of the tests was 25° plus or minus 3° C., and in others the solution was maintained at a temperature of about 80° C. Treatment time in the various tests of the series was either one or one-half hour. In approximately half of the tests 0.5 gm. per liter of "Gardinol" (sodium lauryl sulfate) was employed with the sodium chlorite. The whitest threads were obtained under the following conditions:

| Gms. per liter available chlorine as sodium chlorite | Time | pH | Temperature | Gms. per liter Gardinol | Tensile strength |
|---|---|---|---|---|---|
| | Hours | | ° C. | | Ounces |
| 0.5 | 0.5 | 3 | 80 | 0 | 37.4 |
| 0.5 | 1 | 3 | 25±3 | .5 | 35.8 |
| .5 | .5 | 3 | 80 | .5 | 38.4 |

Generally speaking, the whiteness of the thread improved as the pH decreased, i. e., with increasing acidity. Thus, a pH of 3 gave considerably better results than did a pH of 4 or 5.

The addition of a very small proportion of sodium lauryl sulfate resulted in an improvement in bleaching and permitted the attainment of a white product at room temperature in about one hour.

Other conditions being equal, a better bleach is obtained in one-half hour at 80° C. than in one hour at room temperature.

The tensile strength of the original untreated threads was about 36.6 ounces (average of two tests in a Schopper tensile strength testing machine) so there was no substantial decrease in strength in any case, and an actual but small increase in strength as a result of treatment at the high temperature.

The tensile strength tests were made upon the threads after the above-described treatments followed by a thorough washing of the thread in lukewarm water and by drying. The tensile strength of the treated thread was determined by placing a single thread, after it had been maintained for at least 4 hours at constant temperature and humidity, in the Schopper tensile strength testing machine. The figures reported in the foregoing and following tabulations are in every instance the average of five tests.

In those cases in which there was a loss in tensile strength due to treatment, the loss was substantially negligible, but the losses were generally less as the acidity of the solution increased. Thus, less loss in tensile strength was obtained with solutions having a pH of 3 than with those having a pH of 4 or 5.

SERIES II

In a second series of tests threads similar to those employed in the first series were treated in solutions having a uniform pH of 3. Concentration of sodium chlorite in the solution, however, was equivalent to 1 gm. per liter available chlorine in half of the tests and 2 gms. per liter in the balance. Treatment times were one hour and one-half hour. Half of the tests were run at room temperature and the balance at 80° C. In some of the tests Gardinol, i. e., sodium lauryl sulfate, was employed in concentrations of .5 gm. per liter. The best results from the standpoint of whiteness and tensile strength were obtained under the conditions noted in the following tabulation:

| Gms. per liter available chlorine as sodium chlorite | Time | pH | Temperature | Gms. per liter Gardinol | Tensile strength |
|---|---|---|---|---|---|
| | Hours | | ° C. | | Ounces |
| 1.0 | 0.5 | 3 | 80 | 0 | 34.4 |
| 2.0 | 0.5 | 3 | 80 | 0 | 33.2 |
| 1.0 | 0.5 | 3 | 80 | 0.5 | 37.6 |

The tests showed that concentrations of 1 and 2 gms. per liter available chlorine (as sodium chlorite) resulted in more thorough bleaching than did the concentration of only .5 gm. per liter available chlorine employed in the first series. It was noted, however, that concentrations of 2 gms. per liter available chlorine gave results that were only slightly better than those obtained with concentrations of 1 gm. per liter. Moreover, the addition of the synthetic detergent to solutions containing higher concentrations of chlorine had less beneficial effect than in the less concentrated solutions employed in the first series of tests. However, the synthetic detergent did show, as in the first tests, a tendency to bring about an increase in the tensile strength of the filaments.

The higher concentration of available chlorine in the solution brought about somewhat greater decrease in tensile strength of the thread, although the product was in no case deteriorated to a serious degree. Tests upon original threads prior to treatment showed a tensile strength of 36.6 ounces and under the most disadvantageous condition this strength was not reduced below 33.2 ounces.

Again it was noted that better bleaching was obtained in one-half hour at a temperature of 80° C. than in one hour at room temperature.

SERIES III

A third series of tests was run in which the treatment solutions were definitely alkaline, a relatively high pH, namely, 8 or 9.5 being maintained.

In this series the total available chlorine in the solution was about 1 gm. per liter, this being made up of various proportions of sodium chlorite and sodium hypochlorite, the latter being employed as activator. In all instances the solutions were at room temperature, i. e., 25°±3° C. Other data and results of the tests are given in the following tabulation:

| Gms. per liter total available chlorine | Gms. per liter available as sodium chlorite | Gms. per liter available as sodium hypochlorite | Time | pH | Temperature | Relative whiteness | Tensile strength |
|---|---|---|---|---|---|---|---|
| | | | Hours | | ° C. | | Ounces |
| 1 | .75 | 0.25 | 0.25 | 8 | Room | 4 | 33.4 |
| 1 | .75 | 0.25 | 1.0 | 8 | do | 4 | 34.8 |
| 1 | .75 | 0.25 | 0.25 | 9.5 | do | 4 | 33.6 |
| 1 | .75 | 0.25 | 1.0 | 9.5 | do | 3 | 34.6 |
| 1 | 0.25 | 0.75 | 0.25 | 8 | do | 1 | 33.6 |
| 1 | 0.25 | 0.75 | 1.0 | 8 | do | 3 | 32.4 |
| 1 | 0.25 | 0.75 | 0.25 | 9.5 | do | 3 | 33.0 |
| 1 | 0.25 | 0.75 | 1.0 | 9.5 | do | 2 | 34.0 |

The bleaching accomplished by these solutions containing a total of one gram available chlorine, was about equal to that obtained with the acid solutions of the first series containing only one-half gram per liter available chlorine. The relative whiteness resulting from the various treatments in the series is shown by the numbers in the seventh column, the best results being obtained in the case of No. 1, the next best in the case of No. 2, et seq. Tensile strengths were not seriously affected in the treatment but in general the basic solutions are less satisfactory from this standpoint than are the acid solutions employed in the two prior series.

SERIES IV

In a fourth series, the treatment of the threads was conducted in two stages, in the first of which the threads was subjected to immersion for one-quarter of an hour in an aqueous solution with a pH of 9.5 and containing sodium hypochlorite equivalent to one gram per liter available chlorine. The solutions were allowed to remain at room temperature during the first stage. Thereafter, the samples were transferred, without washing, into a solution containing 0.5 gm. per liter available chlorine as sodium chlorite, and having a pH of 4. In one instance, the thread sample was allowed to remain in such solution at room temperature for one-quarter of an hour, at the end of which time it was reasonably white and had a tensile strength of 31.4 ounces. In another instance, the thread sample was allowed to remain in such a solution for 17¼ hours at a temperature of 80° C. At the end of this time it was very thoroughly bleached but had a tensile strength of 30.2 ounces.

Generally speaking, the various treatments in alkaline solutions exemplified by the third and fourth series are not as satisfactory as the acid treatments exemplified by the first and second series, from the standpoint of bleaching, but both acid and alkaline treatment bring about a substantial improvement in amenability of the resinous bodies here contemplated to dyeing, even in those instances where bleaching is incomplete. The loss in tensile strength in basic solutions is, as indicated hereinbefore, not serious but is, of course, less desirable than the gain in tensile strength brought about in the preferred form of acid treatment.

DYEING TESTS ON PRODUCTS OF TEST SERIES I TO IV

Dyeing tests were conducted upon the samples treated as described hereinbefore in the four series of tests.

The original untreated material was dyed less uniformly than any of the treated samples and lacked "brightness."

All of the treated samples gave better results in dyeing "evenly" than did the original untreated material. Good results from the standpoint of dye penetration were obtained with a sample "A" from the third series which had been subjected to single stage treatment in a solution containing .25 gm. available chlorine as sodium chlorite and 0.75 gm. available chlorine as sodium hypochlorite for one hour at room temperature, the pH of the treatment solution being 9.5. Good results giving even dyeing also were obtained with samples "B," "C" and "D" the treatment data of which is as follows:

Sample "B"

Treated in an acid solution with a pH of 3 containing 2 gms. per liter available chlorine as sodium chlorite, for one hour at room temperature.

Sample "C"

Treated in an acid solution with a pH of 3 containing .5 gm. per liter available chlorine as sodium chlorite, and 0.5 gm. per liter Gardinol, the treatment temperature being 80° C. and the treatment time being one-half hour.

Sample "D"

Treated in an acid solution having a pH of 3 and containing 2 gms. per liter available chlorine as sodium chlorite but no Gardinol. The treatment time was one hour and the temperature treatment was about 25° C.

It will be observed that the treatments given above are excellent for improving the amenability of the resinous bodies to dyeing, quite independently of whether or not the particular treatment results in a bleaching of the product.

Although the practice of the invention has been described with particular reference to threads of a condensation and polymerization product of a diamine and a dibasic acid such as adipic acid, it will be understood that it is applicable generally to the treatment of solid resinous bodies composed of a synthetic linear condensation polymer capable of being drawn into pliable, strong fibres showing by characteristic X-ray patterns orientation along the fibre axis, whether the polymer is drawn to develop such orientation in fibre form or is formed into larger solid bodies such as bristles, rods, sheets, tubes and other forms in which plastics are fabricated. Thus the invention may be employed to bring about the bleaching of or to increase the amenability to dyeing of a variety of solid resinous bodies including those resulting from the condensation and polymerizatiton of hexadecamethylene dicarboxylic acid and trimethylene glycol, polyesters derived from dibasic acids plus diamines, polyanhydrides derived from dibasic acids such as adipic acid and pimelic acid, polyamides derived from amino acids such as 5-aminocaproic acid, etc.

We claim:

1. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises increasing the amenability of the body to dyeing by subjecting it to the action of an aqueous solution containing substantial proportions of chlorite ions.

2. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises bleaching the body and increasing its amenability to dyeing by subjecting it to the action of an aqueous solution containing substantial proportions of chlorite ions.

3. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises exposing the body to the action of an aqueous solution containing substantial proportions of salts selected from the group consisting of alkali metal chlorites.

4. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises exposing the body to the action of an aqueous solution containing available chlorine in proportions ranging from about 0.5 gram per liter to about 5.0 grams per liter in the form of chlorite ions.

5. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises exposing the body to the action of an acid aqueous solution of alkali metal chlorite until the body is bleached substantially.

6. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises exposing the body to the action of an acid aqueous solution of sodium chlorite having a pH ranging from about 3 to about 5 until the body has been bleached substantially.

7. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises exposing the body to the action of an acid aqueous solution of sodium chlorite at a temperature ranging from about room temperature to about 80° C. for a considerable period of time and until the body is bleached substantially.

8. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises exposing the body to the action of an alkaline aqueous solution of sodium chlorite and sodium hypochlorite, whereby the amenability of the body to dyeing is improved.

9. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises exposing the body to the action of an acid aqueous solution containing alkali metal chlorite and an acid-stable synthetic detergent selected from the group consisting of organic sulfates and sulfonates that exerts its detergent action in the solution.

10. In the processing of a substantially solid resinous body composed of a synthetic linear condensation polymer capable of being drawn into relatively pliable strong fibres showing by characteristic X-ray patterns orientation along the fibre axis, said polymer being a polyamide derived from a diamine and a dibasic carboxylic acid, the improvement which comprises exposing the body to the action of an alkaline aqueous solution containing substantial proportions of hypochlorite ions and thereafter subjecting the body to the action of an acid aqueous solution containing substantial proportions of chlorite ion.

ARCHIE L. DUBEAU.
JAMES DOUGLAS MacMAHON.
GEORGE P. VINCENT.